United States Patent [19]

Uemura et al.

[11] Patent Number: 5,499,153
[45] Date of Patent: Mar. 12, 1996

[54] FLOATING MAGNETIC HEAD DEVICE AND ITS SECURING METHOD

[75] Inventors: Norio Uemura; Akira Taguchi; Masayuki Hosoda, all of Mouka, Japan

[73] Assignee: Hitachi Metals, Ltd., Tokyo, Japan

[21] Appl. No.: 257,770

[22] Filed: Jun. 9, 1994

[30] Foreign Application Priority Data

Jun. 10, 1993 [JP] Japan .................................. 5-165165
Jul. 5, 1993 [JP] Japan .................................. 5-190951

[51] Int. Cl.⁶ .................................................. G11B 21/20
[52] U.S. Cl. .................................... 360/103; 360/104
[58] Field of Search .................................... 360/103–104

[56] References Cited

U.S. PATENT DOCUMENTS 5,027,238  6/1991  Konishi et al. ........................ 360/104
5,333,085  7/1994  Prentice et al. ..................... 360/103 X Primary Examiner—John H. Wolff

[57] ABSTRACT

A magnetic head device having a slider attached to a holding member. A recessed groove is formed in the holding member near the trailing edge of the slider. That part of the holding member which is closer to the leading edge than the recessed groove is attached to the back of the slider. For securing the magnetic head, a coating material, such as IPA, is applied to a portion of the trailing edge of the slider. The slider is then attached to the holding member by an adhesive. Thereafter, the IPA is removed by cleaning to form a clearance.

4 Claims, 6 Drawing Sheets

Floating in present invention

Slider without core                    Slider with core
           Frequency    Boundary    Frequency
                        value
                        70.00
                        75.00
                        80.00
                        85.00
                        90.00
                        95.00
                        100.00
                        105.00
                        110.00
                        115.00
                        120.00
                        125.00
                        130.00
                        (nm)

Floating of gimbal not subjected to half etching

Slider without core                    Slider with core
           Frequency    Boundary    Frequency
                        value
                        70.00
                        75.00
                        80.00
                        85.00
                        90.00
                        95.00
                        100.00
                        105.00
                        110.00
                        115.00
                        120.00
                        125.00
                        130.00
                        (nm)

FLOATING MAGNETIC HEAD DEVICE AND ITS SECURING METHOD

BACKGROUND OF THE INVENTION

1. Field of the Invention

This invention relates to a small floating magnetic head device used for a magnetic disk drive and its attachment.

2. Description of the Related Art

Known floating magnetic head devices have a magnetic head attached to an end of a cantilever load arm through a holding member (generally called a "gimbal"). The magnetic head is suspended opposite a surface of a magnetic recording medium. A slider of the magnetic head is arranged to float over the magnetic recording medium with a very small clearance corresponding to a relative speed between the magnetic head and the magnetic recording medium.

Known composite magnetic heads have a slider formed by a nonmagnetic material, and installed with, for example, two air bearings. A magnetic core is inserted and secured in a slit provided in the trailing edge of one air bearing surface, i.e. the rearward edge of the slider with reference to the relative movement of the slider. The magnetic core consists of a pair of Mn—Zn monocrystal ferrite core pieces, between which a magnetic metal film, with a high saturation magnetic flux density, is interposed. A coil is wound around the magnetic core and secured in the slit. To wind the coil around the magnetic core, the slider has a vertical cut-out at the magnetic recording medium exit.

A holding member is interposed between the slider and a load arm. The holding member is provided with a pivot which serves as a support point for the load arm, and keeps the slider at a predetermined angle to the magnetic recording medium when the slider, which is attached to the holding member with adhesives, makes a movement relative to the magnetic recording medium. If the slider floats stably, a stable electromagnetic conversion characteristic can be obtained in recording and reproduction.

The floating magnetic head is attached to a substantially rectangular holding member. The back of the slider is installed on the load arm so that the slider floats over the magnetic disk at a very small clearance. In order for the slider to have a stable floating characteristic, the longitudinal center line of the holding member must be arranged to substantially coincide with that of the slider. Further, the attitude of the slider must be maintained close to parallel to the magnetic recording medium, and sufficient strength must be ensured to prevent the slider from dropping or becoming unbalanced due to partial peeling off. If too much adhesive is applied, to increase adhesive strength, it flows from the adhesive area and sticks onto the trailing edge of the slider. This generates stresses attracting the slider to the holding member which deforms the slider, deteriorating recording/reproducing characteristics.

Japanese U.M. laid open No. 63-87606 discloses that a slider may be prevented from deforming by balancing the rigidity of a pair of air bearings at the cut-out in the trailing edge of the slider. In this case, a reinforcing member is installed in the cut-out of the non-core air bearing at its trailing edge to make the slider rigid at each side and prevent deformation.

In a monolithic magnetic head, when the slider is fixed with adhesives on the holding member of the load arm, if the adhesives stick on the coil-wound portion, the core is pulled toward the holding member, and sagging or concave deformation occurs near the magnetic gap of a center rail. This causes the electromagnetic conversion characteristic to deteriorate. It has been proposed that a groove be provided on the adhering surface of the slider to prevent adhesives from sticking to the coil-wound portion, and to prevent the slider from being deformed (Japanese patent laid open No.4-6614).

In order for a magnetic disk drive to have higher recording density, higher transfer rate, and smaller size, the floating magnetic head must be smaller, have a lower flying height, and provide a more stable flying characteristics. A composite floating magnetic head has a length L of 4.3 mm, a width W of 3.2 mm, and a height H of 0.86 mm for a slider of 34 MIL size. The entire size of the composite floating magnetic head is reduced 70% for a 24 MIL size. A 19 MIL size, called a 50% slider, has a length of 2.1 mm, a width of 1.6 mm, and a height of 0.46 mm.

The flying height of the floating magnetic head must be around 0.1 µm, preferably about 0.05–0.1 µm, compared to the conventional 0.1–0.15 µm. This size constraint requires high accuracy to maintain the predetermined flying height, and a small difference in flying height at each lateral end of the slider.

In the composite magnetic head, the magnetic core is generally inserted and fixed in only one air bearing of the slider at the trailing edge. The trailing edge of the other air bearing is provided with a cut-out, so that the trailing edge of the air bearing pair are not balanced for rigidity.

In addition, the slider has a lower rigidity as a whole because of its reduced size. The excessive adhesive, used for bonding the holding member and the slider, flows toward and sticks on the trailing edge of the slider. This stresses the slider, increasing deformation. This leads to differences in the deformation of the air bearing pair, which, if significant, increases flying height. As a result, difference in the flying height of the air bearing pair (flying height of each lateral end of the slider) is increased.

In solving such problems, a reinforcing member is typically provided in the cut-out in the trailing edge of the slider. But this decreases productivity by requiring more manufacturing steps. If a groove is provided in the slider attachment surface, it is insufficient to use adhesives to prevent slider deformation.

SUMMARY OF THE INVENTION

Accordingly, it is an object of the present invention to prevent the trailing edge of a slider, attached to a holding member with an adhesive, from being deformed asymmetrically thereby avoiding deformation of a pair of air bearings, to allow the slider to stably obtain a predetermined flying height.

Objects of the present invention are achieved in a magnetic head device having a holding member attached to the tip of a load arm, and a slider having an air bearing surface, the slider having a magnetic core fixed in a slit on the trailing edge of its air bearing surface, the back of a slider being fixed to the holding member with an adhesive, wherein a recessed groove is formed in the holding member near the trailing edge of the slider, and adhesives spread until the recessed groove of the holding member. The longitudinal length, in the magnetic recording medium exit direction of the slider that is not fixed with adhesives is one-tenth to one-third of the longitudinal overall length of the slider from its exit. The length of the slider, not fixed with adhesives, is limited because adhesion causes the slider to be readily deformed when the value is less than one-tenth and the fixation of the slider becomes unstable when the value is more than one-third.

Objects of the present invention are also achieved in a holding member formed like a long plate arranged between a slider and a load arm tip, the holding member has a kerf shaped approximately like the "]" character to form a cantilever plate with its trailing edge coupled to the slider. A recessed groove is provided, extending almost all of the width of the cantilever plate, near the trailing edge of the adhering surface of the cantilever plate attached to the slider. The length between the tip of the slider, attached to the cantilever plate, and the recessed groove is one-tenth to one-third of the overall length of the slider from its trailing edge. The length between the trailing edge of the slider and the recessed groove of the portion not attached to the plate with an adhesive is limited to address deformation and fixation of the slider as described above. Two or more parallel recessed grooves may be provided transversely in the cantilever plate.

Objects of the present invention are also achieved in a method for attaching and fixing a slider of a floating magnetic head, opposing a magnetic recording medium, to a holding member attached to the tip of a load arm, comprising applying a coating material readily soluble with an IPA (Isopropyl alcohol) or a paraffin solution on the trailing edge of the surface of the slider attached to the holding member, applying an adhesive to the rest of the adhering surface of the slider to attach this surface to the holding member, removing the coating material applied to the holding member of the slider by cleaning with an IPA or a paraffin solution to form a small clearance between the trailing edge of the slider and the holding member, one of vinyl acetate resin, vacuum grease, varnish, and paint being used as coating material for the trailing edge, a heat hardenable resin or an ultraviolet-hardenable resin is used as the adhesive for attaching the slider to the holding member.

Objects of the present invention are further achieved in a magnetic head device wherein a slider of a floating magnetic head opposite a magnetic recording medium is attached with an adhesive to a holding member attached to a load arm, and a small clearance is provided on the trailing edge of the adhering surface of the slider attached to the magnetic head and the holding member, with the rest of the surface fixed with an adhesive, the length in the magnetic recording medium exit direction of that part of the adhering surface, which has a clearance between the slider and the holding member, is one-tenth to one-third of the overall length of the slider in the magnetic recording medium leaving direction, the length in the magnetic recording medium exit direction, of that part of the slider which is not fixed with an adhesive to the holding member, is limited to one-tenth to one-third of the length of the slider in the magnetic recording medium exit direction.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 1 (b) is a side view of a floating magnetic head device with a pivot on the load arm in accordance with the first preferred embodiment of the present invention.

DESCRIPTION OF THE PREFERRED EMBODIMENTS

Figure 1A:
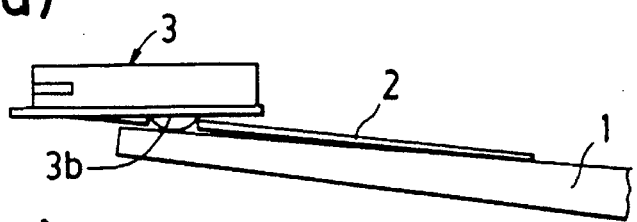
FIG. 1 (a) is a side view of a small floating magnetic head device with a pivot on the holding member in accordance with a first preferred embodiment of the present invention.

Reference will now be made in detail to the present preferred embodiments of the present invention, examples of which are illustrated in the accompanying drawings, wherein like reference numerals refer to like elements throughout.

Figure 1B:
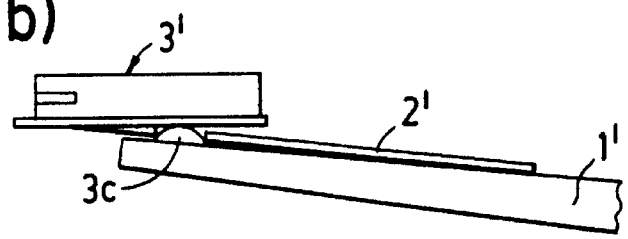

FIG. 1(a) is a side view of a floating magnetic head device with a holding member 2 attached to the tip of a load arm 1, the base of which is fixed. A magnetic head 3 is attached, via a pivot 3b, to the holding member 2 with an adhesive. Recording and reproduction are performed by the magnetic head 3 floating above (or below) a magnetic recording medium with a small clearance. The magnetic recording medium moves from right to left in the direction of the arrow, such that the right side of the magnetic head would be the leading edge and the left side of the magnetic head would be the trailing edge. The magnetic head 3 preferably has a length of 1.8 to 4.4 mm, a width of 1.0 to 3.2 mm, and height of 0.3 to 0.9 mm. FIG. 1(b) is a side view of a floating magnetic head device wherein a pivot 3c is provided on the load area 1.

Figure 2:
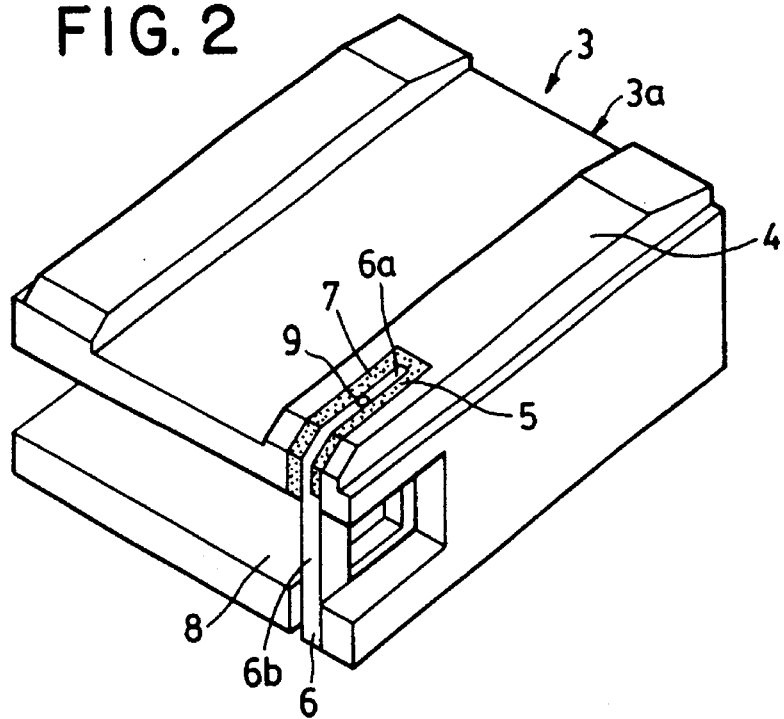
FIG. 2 is a perspective view of a magnetic head in accordance with the first preferred embodiment of the present invention.

FIG. 2 is a perspective view of the magnetic head 3 showing a magnetic core 6 inserted into a slit 5 formed on the trailing edge of one of the two air bearings 4. The air bearing 4 are provided on a slider 3a, preferably comprising CaTiO3. The magnetic core 6 is fixed with a glass material 7. The slider 3a has a vertical cut-out 8 on its trailing edge, so as to allow a coil to be wound round the magnetic core 6.

A pair of magnetic substance core-bars 6a and 6b form the magnetic core 6 and preferably comprise MnO–ZnO single crystal ferrite composed of 28 MnO and 19 ZnO with the rest substantially comprising Fe2O3 (mol. %). The magnetic core 6 is formed by sputtering, on one or both of the core-bars, a Fe–Al–Si metallic magnetic thin film 9, commonly called Sendust, composed of 6 Al and 8 Si with the rest substantially comprising Fe (wt. %). The core-bars are then attached to each other with glass.

Figure 3:
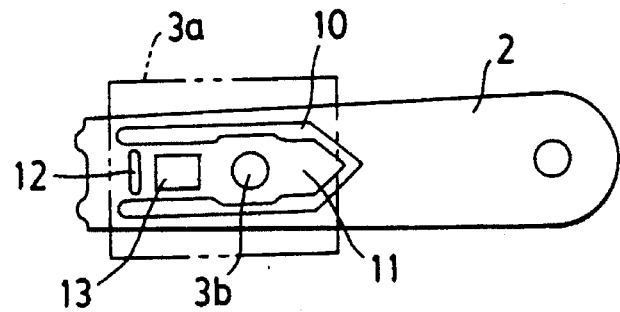
FIG. 3 is a plan view of a holding member in accordance with the first preferred embodiment of the present invention.

FIG. 3 is a plan view of the holding member 2 which is a long plate having its proximal end fixed to the load arm 1. The holding member 2 has an approximately "]"-shaped groove 10 at its tip, forming a cantilever 11. The tip of the holding member 2 is coupled to the magnetic head 3. The cantilever 11 has a recessed groove 12 at its tip (on the trailing edge) which extends over the overall width of the cantilever 11. The recessed groove 12 is formed by half etching, such that both ends of the groove 12 are inside both side edges of the cantilever 11.

Figure 4:
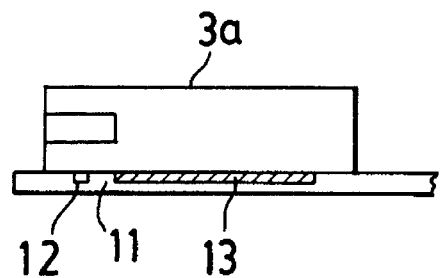
FIG. 4 is a cross-sectional view of a slider attached to the holding member in accordance with the first preferred embodiment of the present invention.

FIG. 4 is a side view of the floating magnetic head device. In this embodiment, that part of the cantilever 11 which is closer to the leading edge than the recessed groove 12 is formed as a recess 13 by half etching as shown. An adhesive is applied to the recess 13 to allow the back of the slider 3a of the magnetic head 3 to be attached. Namely, the adhesive is spread toward the leading edge from the groove 12.

The holding member 2 is preferably 38 μm thick and 0.1 mm deep, while the recessed groove 12 is preferably 32 μm wide and 19 μm deep. The recessed groove 12, provided in the cantilever 11, is positioned so that the length, between the trailing end of the recessed groove 12 and the trailing edge, is one-tenth to one-third of the length of the slider 3a, in the direction of relative movement of the magnetic recording medium, when the back of the slider 3a of the magnetic head 3 is attached to the cantilever 11. The position of the recessed groove is regulated in this manner to prevent the fixed adhesive from deforming the slider 3a and to stabilize the slider 3a.

Figure 6:
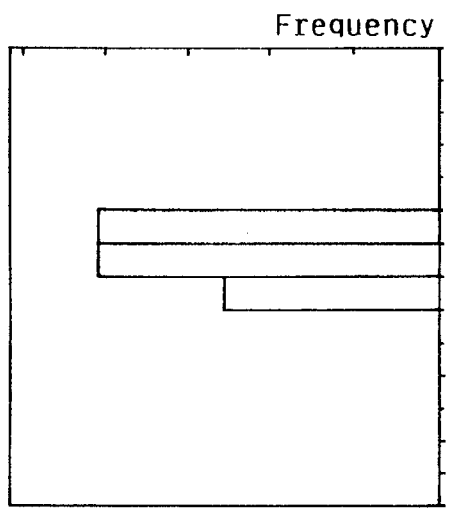
FIG. 6 is a chart of the floating characteristic of slider floating in accordance with the first preferred embodiment of the present invention.
Figure 6:
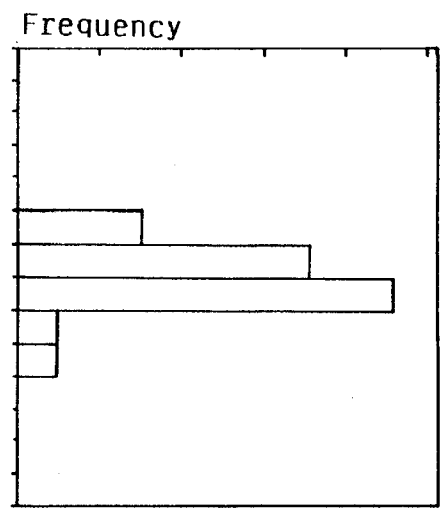
Figure 7:
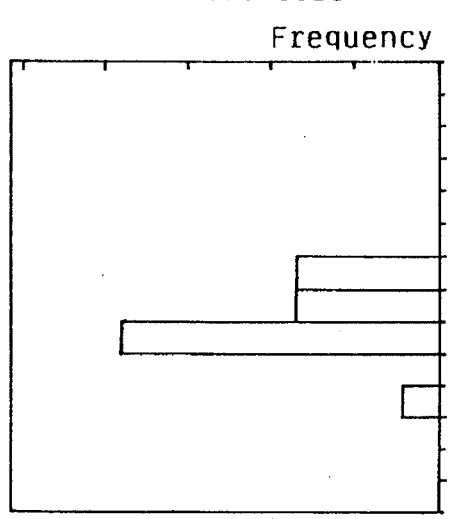
FIG. 7 is a chart of the floating characteristic of conventional slider floating not subjected to half etching.
Figure 7:
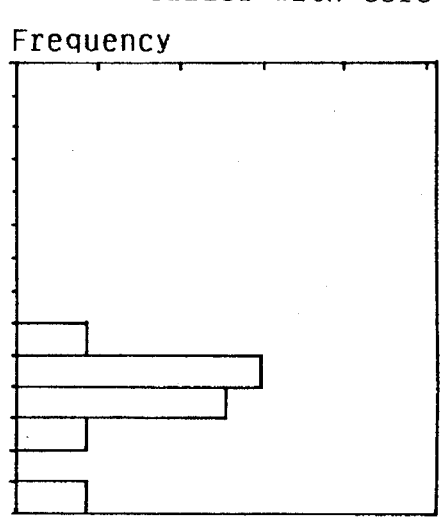
Figure 8:
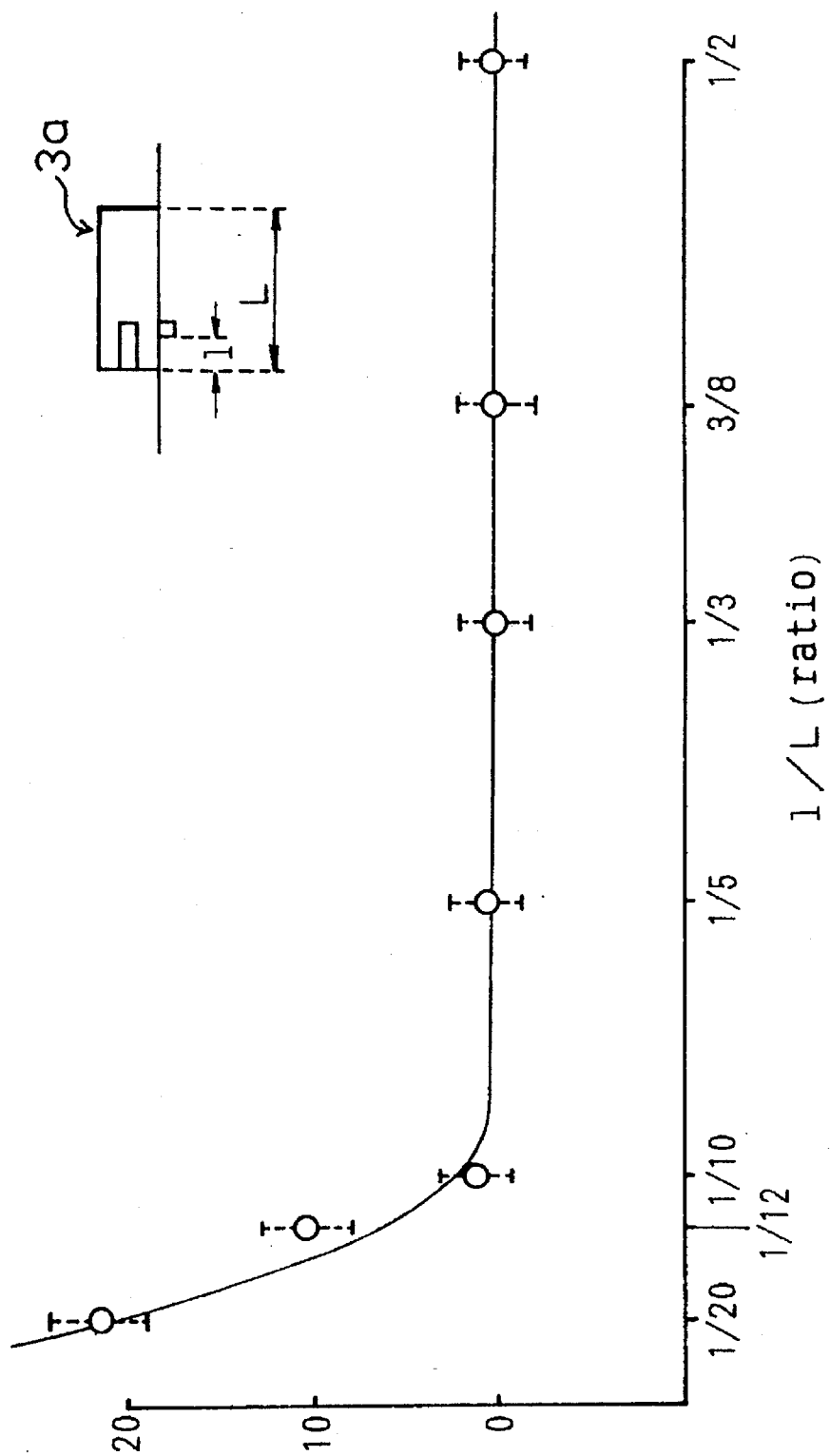
FIG. 8 is a chart of various l/L ratio characteristics and the corresponding amounts of deformation of the two air bearing surfaces of the slider in accordance with the first preferred embodiment of the present invention.

FIG. 6 shows an example of the distribution of the amount of deformation of the two air bearings with a gimbal in accordance with the present invention. FIG. 7 shows a similar example with a conventional gimbal wherein the ratio of the length l, between the recessed groove 12 and the trailing edge of the slider 3a to the overall length L ( in the magnetic recording medium exit direction) of the slider in the direction of relative movement of the magnetic recording medium would be ½0 to ⅜. FIG. 8 shows the amount of deformation of the two air bearings when the l/L ratio is varied within the range of ½0 to ⅜. The amount of floating is stable when half etching is provided such that the l/L ratio is ⅟10 to ⅜, whereas the same amount was unbalanced for the conventional gimbal and when the l/L ratio was ⅟12 or less. However, the fixation of the slider 3 was unstable when the ratio was ⅜ or more.

Figure 5A:
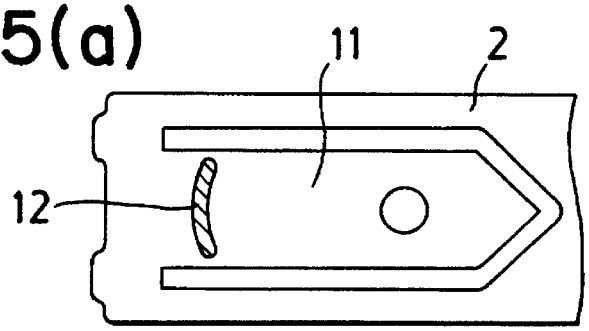
FIG. 5(a)–5(c) are plan views of various embodiments of a holding member having a recessed groove in accordance with the first preferred embodiment of the present invention.
Figure 5B:
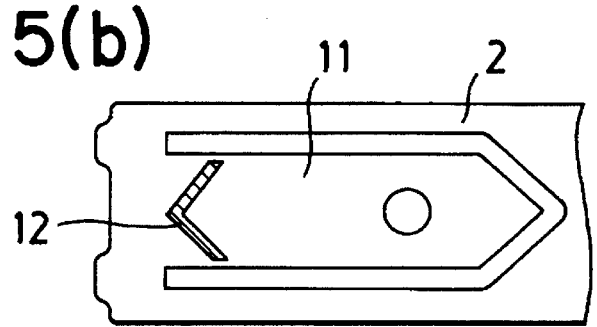
Figure 5C:
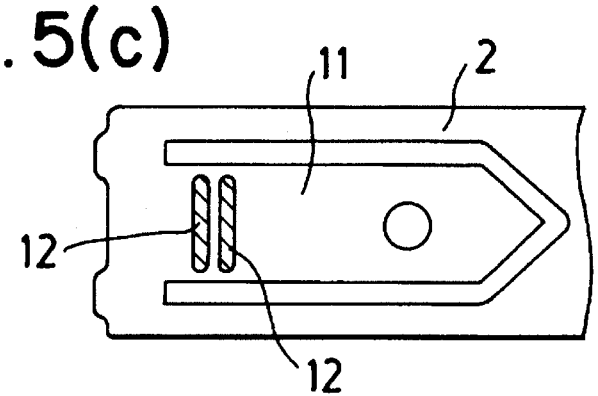

FIGS. 5 (a) to 5 (c) are plan views of the holding member 2 showing various configurations of the groove 12. As shown in FIGS. 5 (a) to 5 (c) (and FIG. 3), the recessed groove 12 may be shaped like a straight line, an arc, the "<" character, or two lines, so long as it can prevent the adhesive applied to the cantilever 11 from flowing to the trailing edge. In any event, the grooves 12 are preferably provided transversely to the cantilever 11. Although FIGS. 3 and 5 (a) to (c) all show a pivot 3b provided on the holding member 2 in accordance with FIG. 1 (a), the effect of the recessed groove 13 is the same if the pivot 3c is on the load arm 1 as shown in FIG. 1 (b).

Because the recessed groove 13 is formed on the trailing edge of the holding member 2, excess adhesive is prevented by the groove 12 from flowing if the back of the slider 3a is attached to the holding member 2 with an adhesive. Thus, the adhesive does not stick to the trailing edge of the slider 3a, and the slider is prevented from deformation. Thus the slider 3a floats at the correct reference height, and a stable recording and playback characteristic is obtained.

In addition, the fixation of the slider 3a is stable because at least two-thirds of the overall length of the slider 3a is attached to the holding member 2 with an adhesive.

Although the first embodiment of the present invention has been described with respects to a specific configuration, it will be recognized that the first embodiment is not limited to the specific configuration.

Next, a second preferred embodiment is described with reference to FIGS. 9 to 13. The approximate arrangement of the magnetic head 3 and the holding member 2 is as shown in FIGS. 1 and 2.

Figure 9:
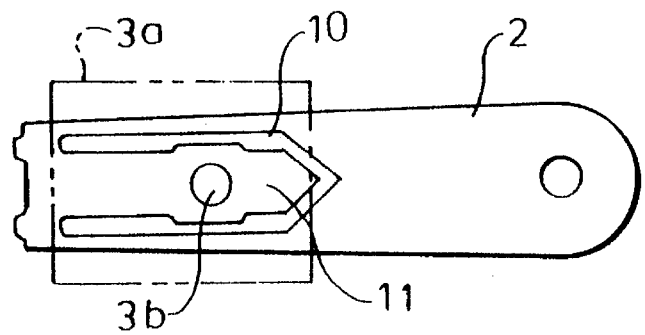
FIG. 9 is a plan view of a holding member in accordance with a second preferred embodiment of the present invention.

FIG. 9 is a plan view of a holding member 2 in accordance with the second preferred embodiment. The holding member 2 is a long plate with its proximal end fixed to the load arm 1 and has an approximately "]"-shaped groove 10 at its tip so as to form a cantilever 11 with its tip coupled to the magnetic head 3. The cantilever 11 is provided with a pivot 3b which is supported by a load arm 1. A slider 3a is supported at an appropriate angle from a magnetic recording medium with a pivot 3b acting as a support.

Figure 11:
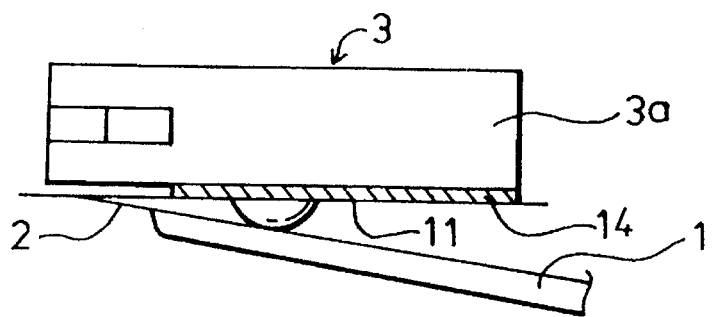
FIG. 11 is a side view of the slider attached to the holding member in accordance with the second preferred embodiment of the present invention.

FIG. 11 is a side view of the slider 3 attached to the holding member 2. An adhesive 14 is applied to the holding member 2, other than the part of the tip (trailing edge) of the cantilever 11. The slider 3a is attached to the cantilever 11 with a small clearance between its trailing edge and the holding member 2, with the remainder of the slider 3a being attached to the cantilever 11 with the adhesive 14.

Table 1 shows the results of experiments conducted to determine what ratio of the length of the non-adhering part of the slider 3a, in the magnetic recording medium exit direction, to the overall length is desirable for preventing deformation and adding adhesive strength to the slider.

TABLE I

| RATIO OF OVERALL LENGTH OF NON-ADHERING PART | PRESENCE OF DEFORMATION | ADHESIVE STRENGTH |
| --- | --- | --- |
| ⅟20 | Present | Strong |
| ⅟10 | Minor Deformation | Strong |
| ⅕ | Absent | Strong |
| ³⁄10 | Absent | Somewhat strong |
| ⁴⁄10 | Absent | Weak |

A desirable magnetic head 3 that prevents slider 3a deformation and has an enhanced adhesive strength can be provided when the length of the adhering part of the slider in the longitudinal direction (magnetic recording medium exit direction) is limited to one-tenth to one-third of its overall length in the same direction.

Figure 10:
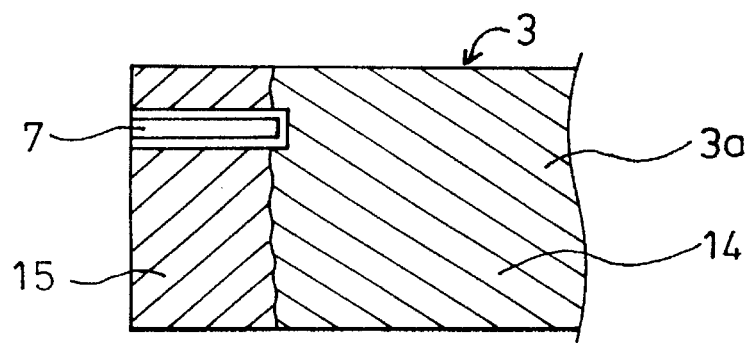
FIG. 10 is a diagram showing the adhering surface of the slider provided with an adhesive in accordance with the second preferred embodiment of the present invention.

FIG. 10 is a diagram explaining a method for using an adhesive 14 to fix the slider 3a of the magnetic head 3 to the holding member 2. A coating material 15, readily soluble with one kind of IPA as alcohol, ethyl alcohol, acetone ethyl acetate, or toluene or a paraffin solution, is applied to the trailing edge of the adhering surface of the slider 3a. The adhesive 14 is also applied to the rest of the adhering surface of the slider 3a. The adhering surface of the slider 3a is then attached to the holding member.

After the slider 3a is attached to the holding member 2, as described above, the coating material 15, applied to the holding member 2 of the slider 3a, is removed by cleaning with an IPA solution to form a small clearance between the trailing edge of the slider 3a and the holding member 2 as shown in FIG. 11. A paraffin type solution or the like may be used as the cleaning solution in place of the IPA solution.

Although the second embodiment of the present invention has been described with respect to a specific configuration, it will be recognized that the second embodiment is not limited to the specific configuration. For example, although a vinyl acetate resin was used as coating material 15 to be applied to the trailing edge of the slider 3a, a vacuum grease, a varnish, or a pigment that is readily soluble with IPA or a paraffin solution may also be used. In addition, although thermally hardenable resin was used as an adhesive 14 for the slider 3a and the holding member 2, an ultraviolet hardenable resin is also applicable.

Figure 12:
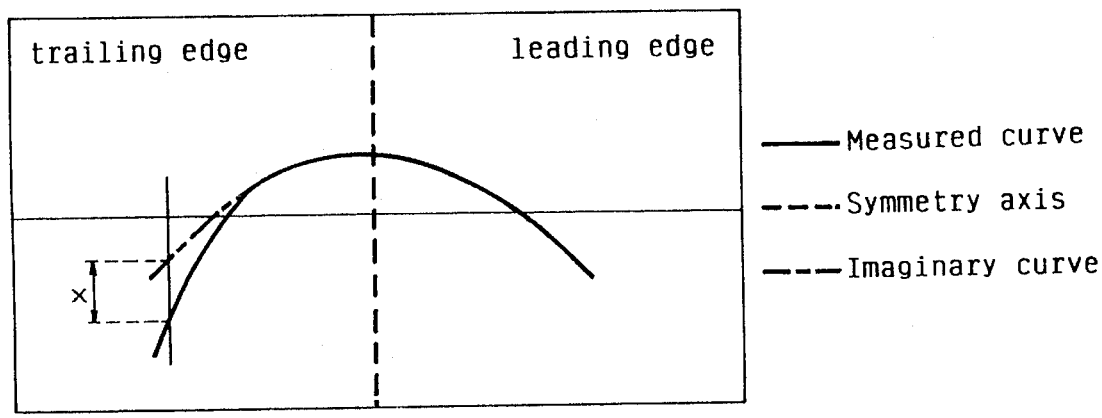
FIG. 12 is a diagram describing a method for evaluating slider deformation in accordance with the second preferred embodiment of the present invention.

FIG. 12 is a graph for use in comparing slider deformation in a magnetic head 3 having the slider 3a fixed to the holding member 2 as described above (present invention) and a conventional magnetic head fixed to a conventional holding member without use of this method (conventional example). An imaginary curve (dashed line) is obtained by inversion of the profile of the leading edge with the longitudinal center of the slider as a symmetry axis. The deviation (x) from the imaginary curve at the gap position 100 μm inward from the trailing edge is read as the amount of slider deformation.

Figure 13:
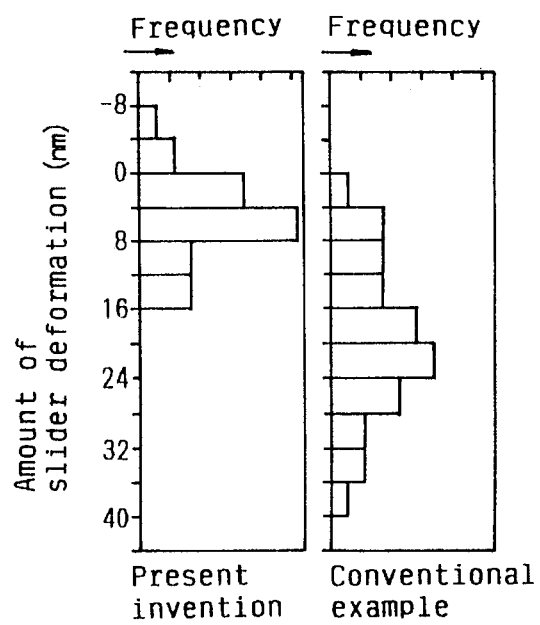
FIG. 13 is a chart comparing the distribution of the amount of deformation of the slider in accordance with the second preferred embodiment of the present invention.

FIG. 13 is a chart of the slider deformation in the present invention and the conventional example clearly showing that the slider 3a attached and fixed to the holding member 2 by the method in accordance with this invention is not subject to large deformation. FIG. 13 shows the distribution of the amount of slider deformation of the magnetic head determined by the above evaluation. Since the slider 3a is not subject to large deformation, the magnetic core 6 is not subject to stress either, and the recording and playback characteristic is thus maintained properly.

In the magnetic head device created by the above magnetic head attachment, that is, the magnetic head 3 device with a clearance provided between the trailing edge of the slider 3a and the holding member, the trailing edge of the slider 3a is not attached to the holding member, and a clearance is formed. Consequently, the hardening of the adhesive does not cause stress on the slider 3a which may cause deformation, the slider 3a floats at the predetermined height, and a stable recording and playback characteristic is obtained. In addition, the absence of stress on the magnetic core 6 also contributes to maintaining the recording and playback characteristic properly.

The slider 3a is also stable because at least two-thirds of the overall length of the slider 3a is attached to the holding member with an adhesive.

Although a few preferred embodiments at the present invention have been shown and described, it would be appreciated by those skilled in the art that changes may be made in these embodiments without departing from the principals and spirit of the invention, the scope of which is defined in the claims and their equivalents.

We claim:

1. A floating magnetic head device comprising:

a load arm;

a holding member attached to the tip of the load arm, the holding member having a recessed groove; and a slider with an air bearing surface, having a leading and a trailing edge, the slider provided with a slit for holding a magnetic core on the trailing edge of the air bearing surface, the back of said slider being fixed with adhesive, to that part of the holding member closer to the leading edge of the air bearing surface than the recessed groove, whereby excess adhesive is trapped in said recessed groove.

2. A floating magnetic head device, as set forth in claim 1, wherein the length of the slider which is not fixed with adhesive is one-tenth to one-third of the overall length of the slider.

3. A holding member for attaching a slider to a load arm, the holding member comprising:

an elongated body interposed between the slider and the tip of the load arm so as to hold the slider onto the tip of the load arm, the elongated body being provided with a bracket shaped kerf forming a cantilever plate, a trailing edge of the cantilever plate being coupled to the slider with adhesive, wherein a transverse recessed groove is provided near the trailing edge of the cantilever plate extending substantially across the width of the cantilever plate such that the length between a trailing edge of the slider and the transverse recessed groove is one-tenth to one-third of the overall length of the slider, whereby excess adhesive is trapped in said recessed groove.

4. A holding member as set forth in claim 3, wherein a plurality of transverse recessed grooves are provided in the cantilever plate.

* * * * *

UNITED STATES PATENT AND TRADEMARK OFFICE
CERTIFICATE OF CORRECTION

PATENT NO.   : 5,499,153
DATED        : March 12, 1996
INVENTOR(S)  : Uemura et al.

It is certified that error appears in the above-indentified patent and that said Letters Patent is hereby corrected as shown below:

<u>Column 4</u>, line 18    "1/L" should be --$\ell$/L--;
            line 56    "arrow" should be in BOLD letters.

<u>Column 5</u>, line 47    "1" should be --$\ell$--;
            line 52    "1/L" should be --$\ell$/L--;
            line 54    "1/L" should be --$\ell$/L--;
            line 56    "1/L" should be --$\ell$/L-.

Signed and Sealed this

Eleventh Day of June, 1996

*Attest:*

BRUCE LEHMAN

*Attesting Officer*        *Commissioner of Patents and Trademarks*